(12) United States Patent
Fulker (10) Patent No.: US 11,198,493 B2
(45) Date of Patent: Dec. 14, 2021

(54) MARINE OUTBOARD MOTOR WITH CRANKCASE VENTILATION

(71) Applicant: COX POWERTRAIN LIMITED, Shoreham-by-Sea (GB)

(72) Inventor: Nile Fulker, Shoreham-by-Sea (GB)

(73) Assignee: COX POWERTRAIN LIMITED, Shoreham-by-Sea (GB)

( * ) Notice: Subject to any disclaimer, the term of this patent is extended or adjusted under 35 U.S.C. 154(b) by 0 days.

(21) Appl. No.: 16/796,215

(22) Filed: Feb. 20, 2020

(65) Prior Publication Data

US 2020/0283115 A1 Sep. 10, 2020

(30) Foreign Application Priority Data

Mar. 7, 2019 (GB) ..................................... 1903091

(51) Int. Cl.
*B63H 20/32* (2006.01)
*B01D 45/08* (2006.01)
(Continued)

(52) U.S. Cl.
CPC ............. *B63H 20/32* (2013.01); *B01D 45/08* (2013.01); *B01D 45/14* (2013.01); *B01D 45/16* (2013.01); *B63H 20/002* (2013.01); *F02B 61/045* (2013.01); *F02M 25/06* (2013.01); *F02M 35/10222* (2013.01); *B63H 2020/323* (2013.01)

(58) Field of Classification Search
CPC .............................. B63H 20/32; B63H 20/002; B63H 2020/323; B01D 45/08; B01D 45/14; B01D 45/16; F02B 61/045; F02M 25/06; F02M 35/10222
See application file for complete search history.

(56) References Cited

U.S. PATENT DOCUMENTS 6,152,119 A 11/2000 Hoshiba et al.
6,227,184 B1 5/2001 Katayama et al.
(Continued)

FOREIGN PATENT DOCUMENTS

JP 2001-115814 4/2001
WO WO 2018/225079 12/2018

OTHER PUBLICATIONS

Search Report & Written Opinion issued in Int'l Appl. No. PCT/GB2020/050517 (dated 2020).
(Continued)

*Primary Examiner* — Stephen P Avila
(74) *Attorney, Agent, or Firm* — Barnes & Thornburg LLP (57) ABSTRACT

A marine outboard motor is provided with an internal combustion engine comprising an engine block defining at least one cylinder, an air intake configured to deliver a flow of air to the at least one cylinder, a crankcase in which a crankshaft is mounted for rotation about a crankshaft axis which is substantially vertical when the marine outboard is vertical, and a crankcase ventilation system configured to vent blow-by gases from the crankcase and to supply vented blow-by gases to the air intake. The crankcase ventilation system comprises a lubricant separation chamber for separating lubricant from the blow-by gases. The lubricant separation chamber is defined by the crankcase and extends along the length of the crankcase substantially parallel to the crankshaft axis.

12 Claims, 6 Drawing Sheets

(51) Int. Cl.
  *B01D 45/14*   (2006.01)
  *B01D 45/16*   (2006.01)
  *B63H 20/00*   (2006.01)
  *F02B 61/04*   (2006.01)
  *F02M 25/06*   (2016.01)
  *F02M 35/10*   (2006.01)

(56) References Cited

U.S. PATENT DOCUMENTS

| | | |
|---|---|---|
| 6,346,018 B1 | 2/2002 | Watanabe |
| 6,550,448 B1 | 4/2003 | Isogawa et al. |
| 2001/0025633 A1 | 10/2001 | Takada et al. |
| 2014/0290634 A1* | 10/2014 | Slaughter ........... F01M 13/0416 |
| | | 123/573 |
| 2019/0321765 A1* | 10/2019 | Herman ................ B01D 46/26 |

OTHER PUBLICATIONS

Search and Examination Report issued in Appl. No. GB1903091.5 (dated 2019).
Examination Report issued in Application No. GB1903091.5 (dated Feb. 12, 2021).

* cited by examiner

MARINE OUTBOARD MOTOR WITH CRANKCASE VENTILATION

This application claims priority to United Kingdom application no. 1903091.5, filed Mar. 7, 2019. The disclosure set forth in the referenced application is incorporated herein by reference in its entirety.

TECHNICAL FIELD

The present invention relates to a marine outboard motor with an internal combustion engine comprising a vertically mounted crankshaft and a crankcase ventilation system for venting blow-by gases from the crankcase to the air intake.

BACKGROUND

In order to propel a marine vessel, an outboard motor is often attached to the stern of the vessel. The outboard motor is generally formed of three sections: an upper powerhead including an internal combustion engine; a lower-section including a propeller shaft connected to the internal combustion engine via a vertically orientated drive shaft; and a middle section defining an exhaust gas flow path for transporting exhaust gases from the upper section to the lower section. The internal combustion engine is usually mounted so that the crankshaft rotates about a vertically extending axis. This facilitates connection of the crankshaft to the vertically extending drive shaft extending between the internal combustion engine and the propeller shaft.

During operation, it is common for a small amount of gases in the combustion chamber to leak past the piston rings, even in well-maintained engines. These "blow-by" gases, which can include air, unburned fuel, and combustion gases, collect in the crankcase. If not ventilated, blow-by gases increase the pressure in the crankcase and this can have a negative impact on engine performance. They can also have a detrimental effect on lubricant effectiveness and useful life. Consequently, it is common for internal combustion engines to include a crankcase ventilation system by which blow-by gases can be vented out of the crankcase. Traditionally, blow-by gases were vented from the crankcase to the atmosphere, either directly or via a filter. However, these "open" systems are generally no longer acceptable due to emissions regulations. To meet current emissions standards, modern internal combustion engines typically use a "closed" crankcase ventilation system in which blow-by gases are circulated from the crankcase through breather passages back into the engine intake for combustion and subsequent expulsion from the engine through the exhaust.

With closed crankcase ventilation (CCV) systems, the engine lubricant, which is typically oil, should be separated from vented blow-by gas (also termed "breather gas") before entering the induction system, since it can produce deposits on hot engine components and, when combusted, can adversely affect exhaust emissions. To achieve this, CCV systems typically include a lubricant separator in the crankcase ventilation path. Example known lubricant separators for use in CCV systems include cyclonic lubricant separators, centrifugal lubricant separators, and lubricant separation chambers. Lubricant separation chambers often employ baffles or have a labyrinth structure, both of which force breather gas around a series of obstructions to cause rapid changes in flow velocity and direction to separate lubricant droplets.

One type of known CCV system uses an external lubricant separation chamber which is located outside of the engine block and connected to the crankcase and the air intake by a number of external hoses. However, with marine outboard motors, the available space under the cowl can be extremely limited. This means that it may be necessary to position the external lubricant separation chamber according to the available space under the cowl, rather than to optimise oil separation. This can also lead to excessive and complicated hose routing within an already crowded cowling.

A further type of known CCV system uses a lubricant oil separation chamber which is integrated into the camshaft cover. This is usually achieved by casting baffles into the underside of the camshaft cover using a complex mould before friction welding or bolting an additional cover over the baffles to close the lubricant separation chamber. The baffle chamber is then connected to the crankcase by breather passages extending through the cylinder block and the cylinder head. In use, lubricant drains vertically through the engine to the sump in the crankcase and breather gas is vented in the opposite direction through the separate breather passages. While these systems work well, they can be time consuming to manufacture and require complex tooling.

The present invention seeks to provide an improved marine outboard motor which overcomes or mitigates one or more problems associated with the prior art.

SUMMARY OF THE INVENTION

According to a first aspect of the present invention, there is provided a marine outboard motor having a vertical axis internal combustion engine, the internal combustion engine comprising: an engine block defining at least one cylinder; an air intake configured to deliver a flow of air to the at least one cylinder; a crankcase in which a crankshaft is mounted for rotation about a crankshaft axis which is substantially vertical when the marine outboard motor is vertical; and a crankcase ventilation system configured to vent blow-by gases from the crankcase and to supply vented blow-by gases to the air intake, wherein the crankcase ventilation system comprises a lubricant separation chamber for separating lubricant from the blow-by gases, and wherein the lubricant separation chamber is defined by the crankcase and extends along the crankcase substantially parallel to the crankshaft axis.

With this arrangement, the lubricant separation chamber is integrally formed with the crankcase. This can reduce the space occupied by the lubricant separation chamber relative to external lubricant separation chambers. This facilitates packaging of the outboard motor and can reduce its overall size and/or weight. Additionally, by locating the lubricant separation chamber in the vertically extending crankcase, the breather gas is run up the length of the crankcase and droplets of lubricant, such as oil, can "drop out" of the breather gas under the action of gravity while remaining within the crankcase. This has been found to be particularly advantageous over known cylinder head or cam cover lubricant separator chambers for marine outboard motors, since separated lubricant droplets cannot readily return to the crankcase from a baffle chamber in the cam cover when the engine is aligned along a vertical axis. Furthermore, this arrangement allows the length of the lubricant separation chamber to be increased relative to a baffle chamber in the cam cover, since the crankcase is typically longer than the cam cover.

Preferably, the lubricant separation chamber extends along substantially the entire length of the crankcase. The term "substantially the entire length" means that the oil separation chamber extends along at least 70 percent, preferably at least 80 percent, more preferably at least 90 percent of the overall length dimension of the crankcase.

With this arrangement, the lubricant separation chamber has a tall, vertical shape which increases the amount of lubricant separated from the breather gases.

Preferably, the crankcase comprises a compartment located at the bottom end of the crankcase. The compartment may be separated from the at least one cylinder by a wall. The compartment may be in fluid communication with the rest of the crankcase through one or more apertures in the wall. The lubricant separation chamber preferably has a chamber inlet which extends from the compartment. With this arrangement, the crankcase ventilation system draws blow-by gases into the lubricant separation chamber from the compartment. The compartment is remote from most of the moving components in the engine and so is "quieter" in terms of pressure waves and airborne oil droplets. Consequently, drawing blow-by gases from the sump can result in a smoother and slower flow through the lubricant separation chamber, thereby promoting lubricant separation. It can also result in a reduction in the amount of lubricant which is initially suspended in the blow-by gases. Both of these can reduce the amount of lubricant which is circulated to the air intake.

In other embodiments, the lubricant separation chamber may have a chamber inlet, or inlets, extending from any other part of the crankcase.

The compartment may house a fluid pump by which lubricant is pumped from a sump below the engine to higher parts of the internal combustion engine. In such examples, the compartment may also be regarded as a fluid pump housing chamber, or "oil pump pocket".

Preferably, the chamber inlet which extends from the compartment is the sole inlet of the lubricant separation chamber.

Preferably, the lubricant separation chamber has a chamber outlet extending through an outer wall of the crankcase, wherein the chamber outlet is connected to the air intake by at least one external hose. The at least one external hose preferably comprises a flexible hose. The chamber outlet preferably comprises a spigot by which the at least one hose is attached to the outlet. In other examples, the lubricant separation chamber may be connected to the air intake by one or more internal channels extending horizontally along the engine block.

Preferably, the crankcase ventilation system further comprises an external fluid separator connected to the fluid separator chamber outlet and to the air intake by the at least one external hose. This combines with the fluid separator chamber to reduce the amount of lubricant which is conveyed to the air intake. The external fluid separator is preferably located adjacent to the crankcase. This can reduce the amount of hosing required to connect the chamber outlet to the external fluid separator and to return the lubricant to the crankcase.

Preferably the external lubricant separator comprises one or both of a cyclonic lubricant separator and a centrifugal lubricant separator. Such separators facilitate the separation of smaller droplets from the vented blow-by gases which might still be mixed in the flow of blow-by gases downstream of the lubricant separation chamber. In this manner, the lubricant separation chamber functions to remove larger fluid droplets while the external lubricant separator removes smaller droplets which might otherwise be conveyed to the air intake.

The engine block preferably comprises a cylinder block casting and a bed plate casting which are joined together to form the crankcase. For example, the cylinder block casting and the bed plate casting may be bolted together to form the crankcase.

The lubricant separation chamber may be defined by an open channel in one or both of the cylinder block casting and the bed plate casting which is closed when the cylinder block casting and the bed plate casting are joined together to form the crankcase. This simplifies the manufacture of the lubricant separation chamber by allowing it to be defined in the mould and formed during casting of the cylinder block casting and/or the bed plate casting, rather than by a separate machining process. The lubricant separation chamber may be defined by a closed channel which is cast within the cylinder block casting or the bed plate casting. The lubricant separation chamber may be defined by a closed channel having a first closed portion which is cast within the cylinder block casting and a second closed portion which is case within the bed plate casting, wherein the first and second closed portions are contiguously joined when the cylinder block casting and the bed plate casting are joined together to form the crankcase.

Preferably, the lubricant separation chamber is defined by an open channel in the cylinder block casting which is closed by the bed plate casting when the cylinder block casting and the bed plate casting are joined together to form the crankcase.

The lubricant separation chamber may be a quiescent chamber. That is, a chamber in which the flow of blow-by gases is slowed down and sheltered from pressure pulses such that lubricant is separated under the action of gravity.

The lubricant separation chamber may comprise one or more flow obstructions configured to cause a change in direction and/or velocity of blow-by gases flowing along the length of the lubricant separation chamber and thereby promote lubricant separation.

The one or more flow obstructions may comprise one or more baffles and/or tortuous passageways.

As used herein, the term "engine block" refers to a solid structure in which the at least one cylinder of the engine is provided. The term may refer to the combination of a cylinder block with a cylinder head and crankcase, or to the cylinder block only. The engine block may be formed from a single engine block casting. The engine block may be formed from a plurality of separate engine block castings which are connected together, for example using bolts.

The engine block may comprise a single cylinder. Preferably, the engine block comprises a plurality of cylinders.

The engine block may comprise a single cylinder bank.

The engine block may comprise a first cylinder bank and a second cylinder bank. The first and second cylinder banks may be arranged in a V configuration.

The engine block may comprise three cylinder banks. The three cylinder banks may be arranged in a broad arrow configuration. The engine block may comprise four cylinder banks. The four cylinder banks may be arranged in a W or double-V configuration.

The internal combustion engine is a vertical axis internal combustion engine. In such an engine, the crankshaft is mounted vertically in the engine. The internal combustion engine may be a petrol engine. Preferably, the internal combustion engine is a diesel engine. The internal combustion engine may be a turbocharged diesel engine.

According to a second aspect of the present invention, there is provided a marine vessel comprising the marine outboard motor of the first aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Further features and advantages of the present invention will be further described below, by way of example only, with reference to the accompanying drawings in which.

DETAILED DESCRIPTION

Figure 1:
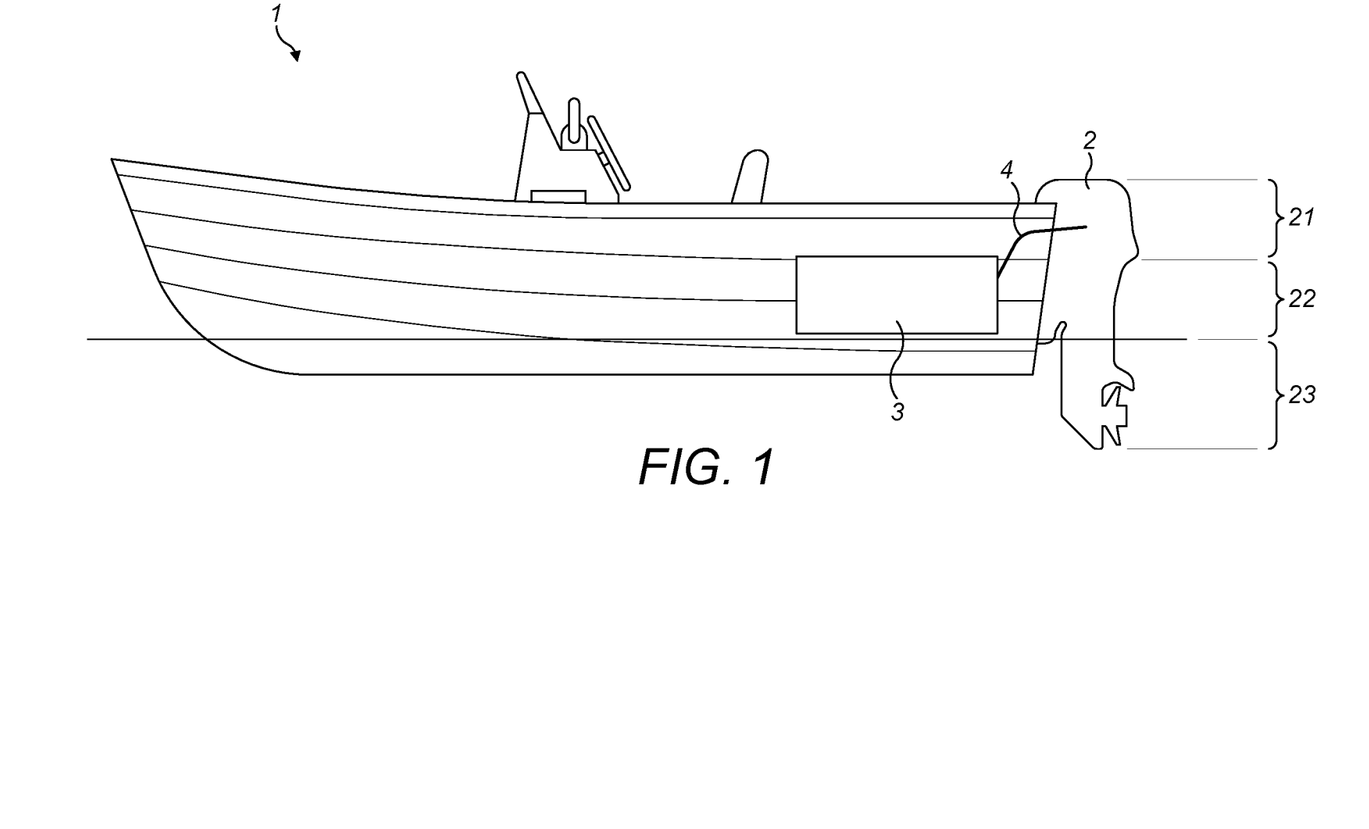
FIG. 1 is a schematic side view of a light marine vessel provided with a marine outboard motor.

FIG. 1 shows a schematic side view of a marine vessel 1 with a marine outboard motor 2. The marine vessel 1 may be any kind of vessel suitable for use with a marine outboard motor, such as a tender or a scuba-diving boat. The marine outboard motor 2 shown in FIG. 1 is attached to the stern of the vessel 1. The marine outboard motor 2 is connected to a fuel tank 3, usually received within the hull of the marine vessel 1. Fuel from the reservoir or tank 3 is provided to the marine outboard motor 2 via a fuel line 4. Fuel line 4 may be a representation for a collective arrangement of one or more filters, low pressure pumps and separator tanks (for preventing water from entering the marine outboard motor 2) arranged between the fuel tank 3 and the marine outboard motor 2.

As will be described in more detail below, the marine outboard motor 2 is generally divided into three sections, an upper-section 21, a mid-section 22, and a lower-section 23. The mid-section 22 and lower-section 23 are often collectively known as the leg section, and the leg houses the exhaust system. A propeller 8 is rotatably arranged on a propeller shaft at the lower-section 23, also known as the gearbox, of the marine outboard motor 2. Of course, in operation, the propeller 8 is at least partly submerged in water and may be operated at varying rotational speeds to propel the marine vessel 1.

Typically, the marine outboard motor 2 is pivotally connected to the stern of the marine vessel 1 by means of a pivot pin. Pivotal movement about the pivot pin enables the operator to tilt and trim the marine outboard motor 2 about a horizontal axis in a manner known in the art. Further, as is well known in the art, the marine outboard motor 2 is also pivotally mounted to the stern of the marine vessel 1 so as to be able to pivot, about a generally upright axis, to steer the marine vessel 1.

Tilting is a movement that raises the marine outboard motor 2 far enough so that the entire marine outboard motor 2 is able to be raised completely out of the water. Tilting the marine outboard motor 2 may be performed with the marine outboard motor 2 turned off or in neutral. However, in some instances, the marine outboard motor 2 may be configured to allow limited running of the marine outboard motor 2 in the tilt range so as to enable operation in shallow waters. Marine engine assemblies are therefore predominantly operated with a longitudinal axis of the leg in a substantially vertical direction. As such, a crankshaft of an engine of the marine outboard motor 2 which is substantially parallel to a longitudinal axis of the leg of the marine outboard motor 2 will be generally oriented in a vertical orientation during normal operation of the marine outboard motor 2, but may also be oriented in a non-vertical direction under certain operating conditions, in particular when operated on a vessel in shallow water. A crankshaft of a marine outboard motor 2 which is oriented substantially parallel to a longitudinal axis of the leg of the engine assembly can also be termed a vertical crankshaft arrangement. A crankshaft of a marine outboard motor 2 which is oriented substantially perpendicular to a longitudinal axis of the leg of the engine assembly can also be termed a horizontal crankshaft arrangement.

Figure 2A:
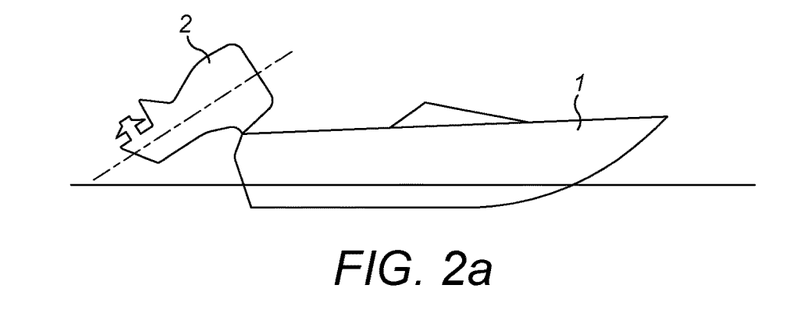
FIG. 2A shows a schematic representation of a marine outboard motor in its tilted position.

As mentioned previously, to work properly, the lower-section 23 of the marine outboard motor 2 needs to extend into the water. In extremely shallow waters, however, or when launching a vessel off a trailer, the lower-section 23 of the marine outboard motor 2 could drag on the seabed or boat ramp if in the tilted-down position. Tilting the marine outboard motor 2 into its tilted-up position, such as the position shown in FIG. 2A, prevents such damage to the lower-section 23 and the propeller 8.

Figure 2B:
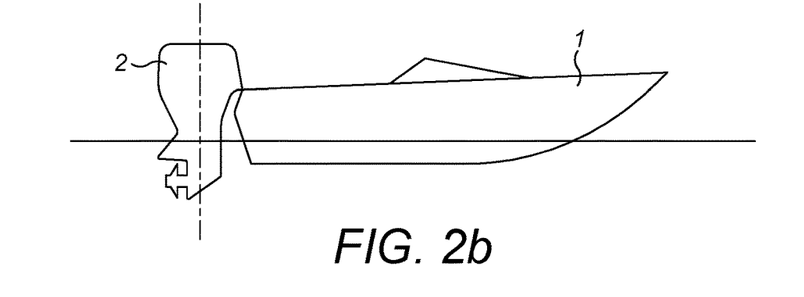
FIGS. 2B to 2D show various trimming positions of the marine outboard motor and the corresponding orientation of the marine vessel within a body of water.
Figure 2C:
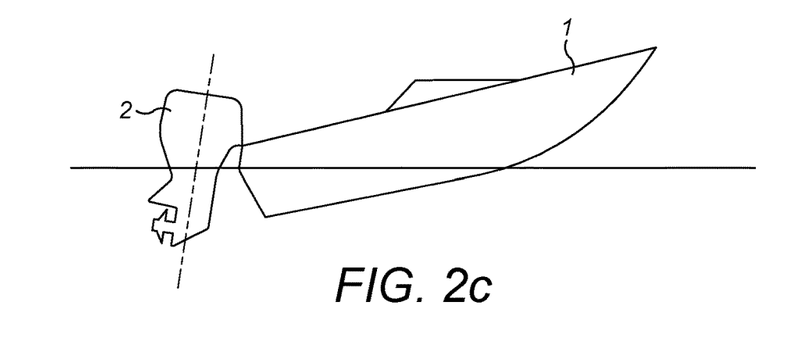
Figure 2D:
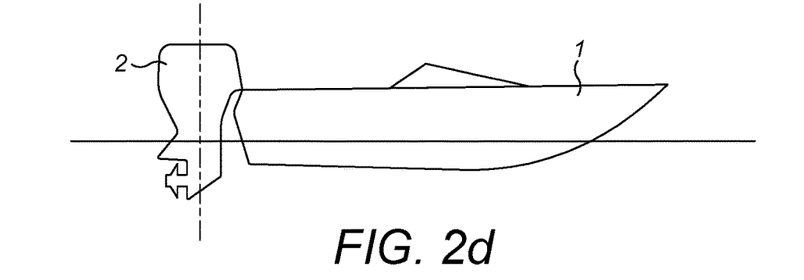

By contrast, trimming is the mechanism that moves the marine outboard motor 2 over a smaller range from a fully-down position to a few degrees upwards, as shown in the three examples of FIGS. 2B to 2D. Trimming helps to direct the thrust of the propeller 8 in a direction that will provide the best combination of fuel efficiency, acceleration and high speed operation of the marine vessel 1.

When the vessel 1 is on a plane (i.e. when the weight of the vessel 1 is predominantly supported by hydrodynamic lift, rather than hydrostatic lift), a bow-up configuration results in less drag, greater stability and efficiency. This is generally the case when the keel line of the boat or marine vessel 1 is up about three to five degrees, such as shown in FIG. 2B for example.

Too much trim-out puts the bow of the vessel 1 too high in the water, such as the position shown in FIG. 2C. Performance and economy, in this configuration, are decreased because the hull of the vessel 1 is pushing the water and the result is more air drag. Excessive trimming-out can also cause the propeller to ventilate, resulting in further reduced performance. In even more severe cases, the vessel 1 may hop in the water, which could throw the operator and passengers overboard.

Trimming-in will cause the bow of the vessel 1 to be down, which will help accelerate from a standing start. Too much trim-in, shown in FIG. 2D, causes the vessel 1 to "plough" through the water, decreasing fuel economy and making it hard to increase speed. At high speeds, trimming-in may even result in instability of the vessel 1.

Figure 3:
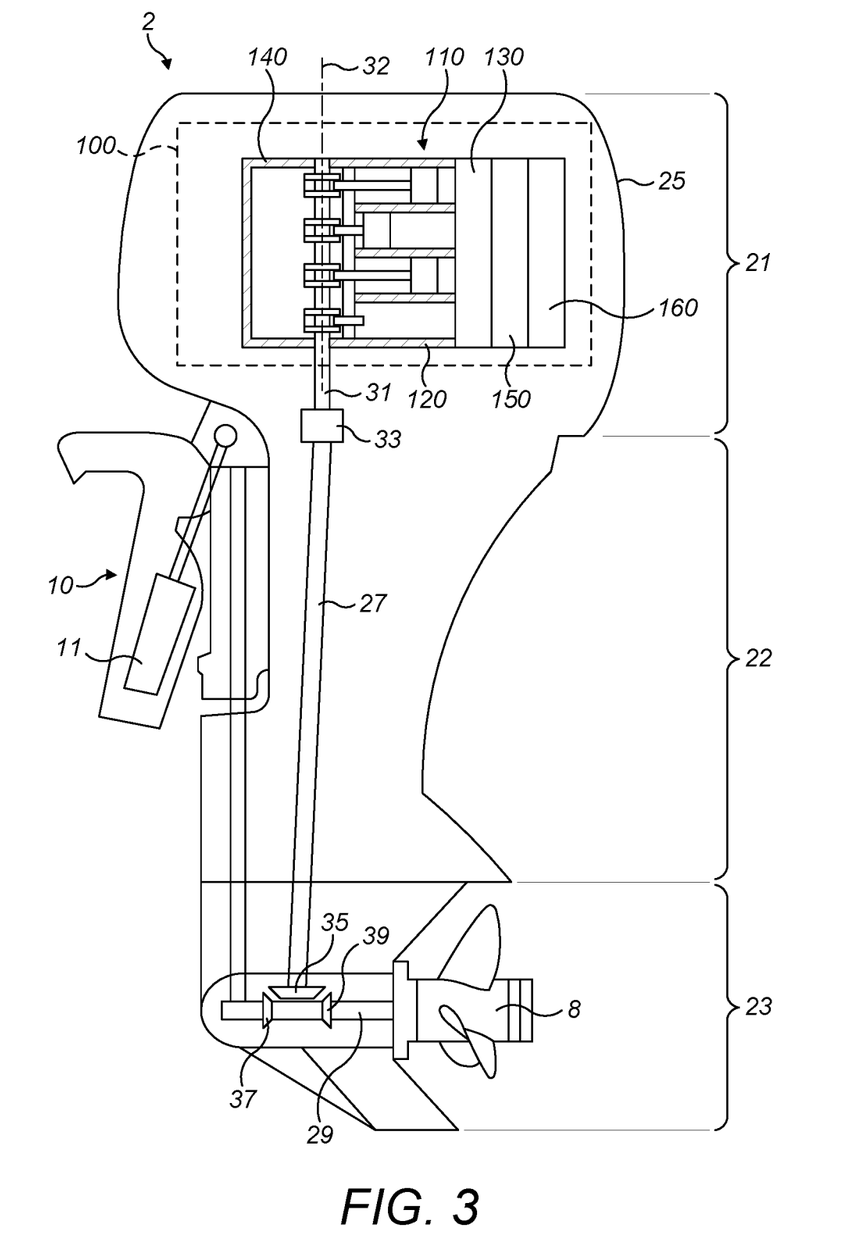
FIG. 3 shows a schematic cross-section of a marine outboard motor according to the present invention.

Turning to FIG. 3, there is shown a schematic cross-section of an outboard motor 2 according to an embodiment of the present invention. The outboard motor 2 comprises a tilt and trim mechanism 10 for performing the aforementioned tilting and trimming operations. In this embodiment, the tilt and trim mechanism 10 includes a hydraulic actuator 11 that can be operated to tilt and trim the outboard motor 2 via an electric control system. Alternatively, it is also feasible to provide a manual tilt and trim mechanism, in which the operator pivots the outboard motor 2 by hand rather than using a hydraulic actuator.

As mentioned above, the outboard motor 2 is generally divided into three sections. An upper-section 21, also known as the powerhead, includes an internal combustion engine 100 for powering the marine vessel 1. A cowling 25 is disposed around the engine 100. Adjacent to, and extending below, the upper-section 21 or powerhead, there is provided a mid-section 22 and a lower section 23. The lower-section 23 extends adjacent to and below the mid-section 22, and the mid-section 22 connects the upper-section 21 to the lower-section 23. The mid-section 22 houses a drive shaft 27 which extends between the combustion engine 100 and the propeller shaft 29 and is connected to a crankshaft 31 of the combustion engine via a floating connector 33 (e.g. a splined connection). At the lower end of the drive shaft 27, a gear box/transmission is provided that supplies the rotational energy of the drive shaft 27 to the propeller 8 in a horizontal direction. In more detail, the bottom end of the drive shaft 27 may include a bevel gear 35 connected to a pair of bevel gears 37, 39 that are rotationally connectable to the propeller shaft 29 of the propeller 8. The mid-section 22 and lower-section 23 form an exhaust system, which defines an exhaust gas flow path for transporting exhaust gases from an exhaust gas outlet 170 of the internal combustion engine 100 and out of the outboard motor 2.

The internal combustion engine 100 is shown schematically as one bank of a four-stroke V8 diesel engine. It will be understood that any other amount of cylinders may be employed in the V-shaped cylinder banks. The skilled person will also understand that any other arrangement, such as an in-line arrangement could alternatively be utilised. The engine of the present invention could equivalently be constructed as a two-stroke-type combustion engine.

The internal combustion engine 100 includes an engine block 110 comprising a cylinder block 120 in which the cylinders are defined, a cylinder head 130, and a crankcase 140. The crankshaft 31 is mounted in the crankcase 140 for rotation about a vertical crankshaft axis 32. The engine 100 also includes an air intake manifold 150 for delivering a flow of air to the cylinders in the engine block, an exhaust manifold 160 configured to direct a flow of exhaust gas from the cylinders, and a crankcase ventilation system which is discussed below with reference to FIGS. 4 to 6. The engine 100 may further include an optional exhaust gas recirculation system (not shown) which is configured to recirculate a portion of the flow of exhaust gas from the exhaust manifold 160 to the air intake manifold 150 and which includes a heat exchanger, or "EGR cooler", for cooling the recirculated exhaust gas.

Figure 4:
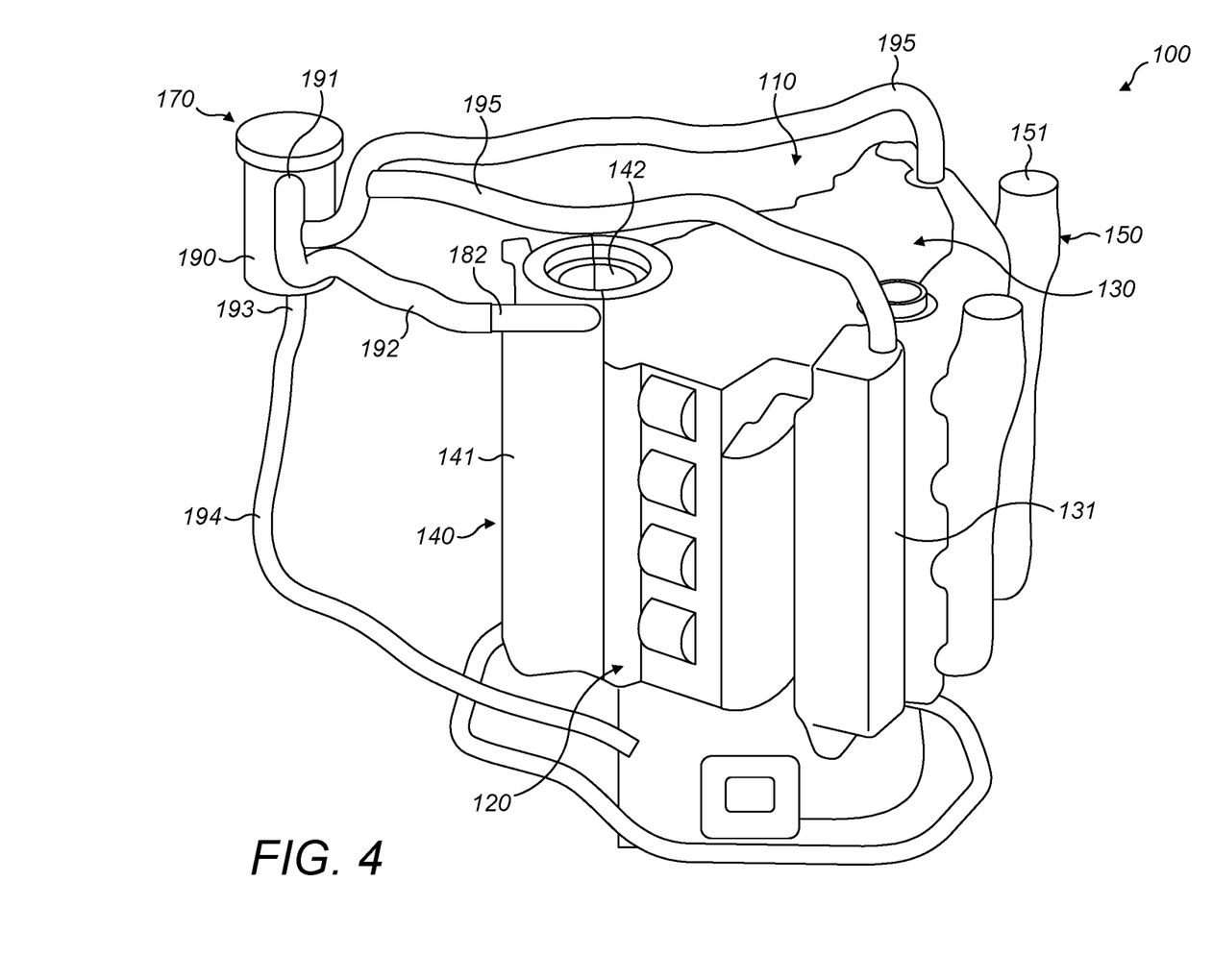
FIG. 4 shows a perspective side view of the internal combustion engine of the marine outboard motor of FIG. 3.
Figure 5:
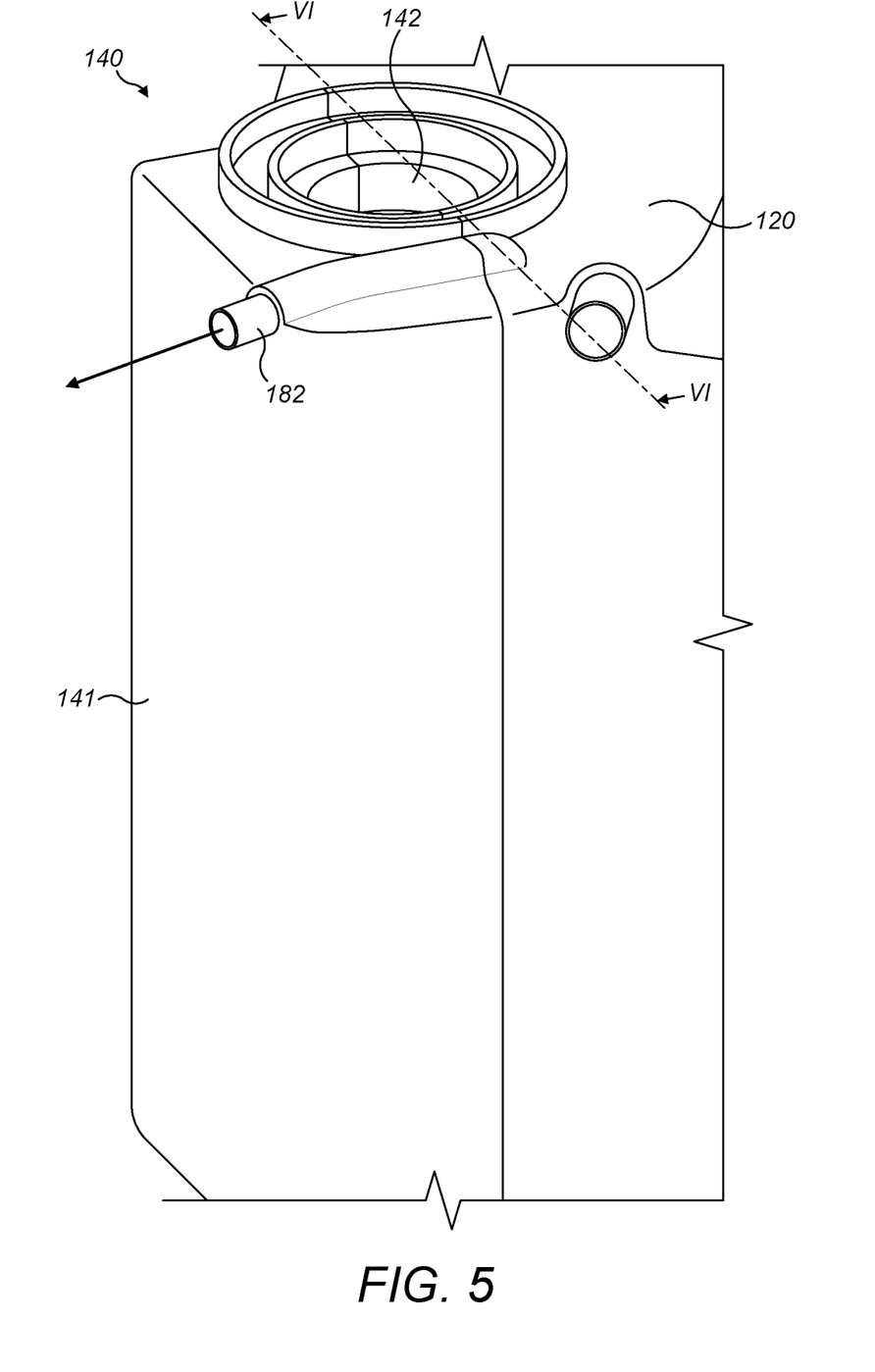
FIG. 5 shows an enlarged perspective side view of the crankcase of the internal combustion engine of FIG. 4.
Figure 6:
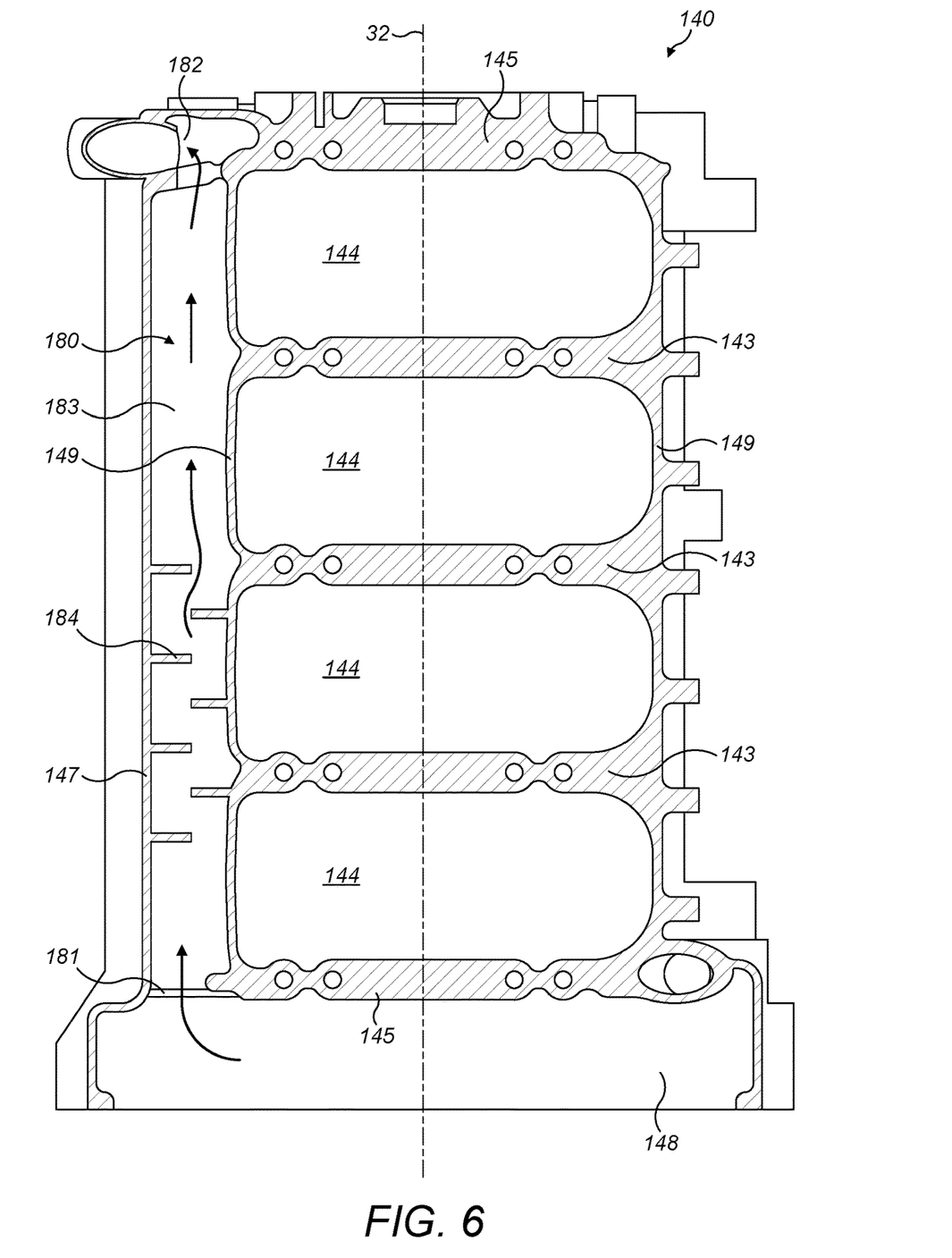
FIG. 6 shows a cross-sectional view taken through line VI-VI in FIG. 5.

Referring to FIGS. 4 and 5, the internal combustion engine 100 has an engine block 110 formed from a cylinder block 120, a cylinder head 130, and a crankcase 140. The cylinder head 130 houses a camshaft (not shown) which is connected to the crankshaft by a timing belt or chain (not shown) and which includes a variety of cams for actuating inlet and exhaust valves in the cylinder head 130. A cam cover 131 is bolted onto the cylinder head 130 to serve as a protective lid over the camshaft and valves. The crankcase 140 forms an enclosure for the crankshaft and is defined by the cylinder block 120 and by a bed plate casting 141 which is bolted to the cylinder block 120 in a conventional manner. The crankcase 140 has an upper opening 142 through which the crankshaft is connected to a flywheel (not shown) and has a lower opening (not shown) through which the crankshaft is connected to the drive shaft. The structure of the crankcase 140 is discussed in more detail below with reference to FIG. 6. The air intake manifold 150 of each bank of the engine 100 is attached to its respective cam cover 131 and has an air intake inlet 151 through which air is supplied to the engine 100 via air inlet ducting (not shown). The exhaust manifold 160 is connected to an exhaust outlet (not shown) through which exhaust gases can be expelled from the engine via the exhaust system. The engine may further include one or more turbochargers with a turbine housing connected to the exhaust manifold and a compressor housing connected to the air inlet ducting. The engine 100 further includes a crankcase ventilation system 170 configured to vent blow-by gases from the crankcase 140 and to supply vented blow-by gases to the air intake manifold 150. The crankcase ventilation system 170 includes an integral lubricant separation chamber (180: FIG. 6) within the crankcase 140 and an external lubricant separator in the form of a centrifugal lubricant separator 190, both of which are for separating lubricant from the blow-by gases. The centrifugal lubricant separator 190 has a separator inlet 191 which is connected to a chamber outlet 182 of the lubricant separation chamber by a first external hose 192. The centrifugal lubricant separator 190 also has a gas outlet (not shown) which is connected to the air intake by a second external hose (not shown), and has a drain outlet 193 on its underside which is connected to a lubricant reservoir (not shown) beneath the engine 100 by a third external hose 194. In this embodiment, the cam cover 131 of each cylinder bank includes an optional baffle chamber for separating lubricant from gases circulating beneath the cam cover 131 wherein each baffle chamber is connected to the separator inlet 191 by a fourth external hose 195. The space under the cam covers may be linked to the crankcase enclosure by a linking passage in order to equalise pressures and gases may enter the space under the cam covers via this linking passage. Additionally, small amounts of gas may leak past the valve stem seal and into the space under the cam cover 131. The baffle chambers in the cam covers 131 separate larger droplets of lubricant from the gases under the cam covers 131 to reduce the burden on the centrifugal lubricant separator 190.

FIG. 6 shows a cross-sectional view through the crankcase 140 of the internal combustion engine 100. The crankcase 140 has an outer casing 147 which defines the crankcase enclosure and which is formed by the outer walls of the cylinder block casting and the bed plate casting from which the cylinder block 120 and bedplate 141 are constructed. The crankcase 140 also has side walls 149 which are joined by end walls 145 and three cross-walls 143 which extend across the width of the crankcase enclosure to divide it into four enclosure sections 144, with one enclosure section 144 being provided for each pair of cylinders in the cylinder block. The enclosure sections 144 are each positioned adjacent to one of the cylinders of the engine and provide a cavity in which the crankpin journal and connecting rod of the piston reciprocating within its respective cylinder is free to rotate. The crankcase enclosure is bounded at its upper and lower ends by the end walls 145. The cross-walls 143 and end walls 145 each form a semi-circular support surface for the main journals of the crankshaft. The support surfaces provided by the cross-walls 143 and the end walls 145 define the crankshaft axis 32 which extends vertically through the crankcase 140. Below the lower end wall 145, which bounds the lower enclosure section 144 is a compartment 148 which is in fluid communication with the four enclosure sections 144 through apertures in the cross-walls 143 and lower end wall 145. A pump (not shown) may be provided in the compartment 148 to circulate lubricant to higher parts of the engine 100. The compartment 148 is separated from the pistons and the counterweights and crankpin journals of the crankshaft by the cross-walls 143 and end wall 145 and so is "quieter" in terms of pressure waves and airborne oil droplets than other parts of the crankcase.

Positioned between the outer casing 147 and one of the side walls 149 is a lubricant separation chamber 180. The lubricant separation chamber 180 extends vertically along substantially the entire length of the crankcase from a chamber inlet 181 which is open to the compartment 148, to the chamber outlet 182 which extends through the outer casing 147 at the top end of the crankcase 140. The lubricant separation chamber 180 is defined by an open channel 183 in the casting of the cylinder block 120. In this example, the channel 183 is cast in the cylinder block 120 so that it is closed around its circumference. In other examples, the channel 183 can be cast in the cylinder block 120 such that it is open in the direction of the bed plate 141 and is subsequently closed along its length by the bed plate 141 when the bedplate 141 is assembled against the cylinder block 120 to form the crankcase 140. The lubricant separation chamber 180 has a number of optional flow obstructions in the form of baffles 184 which extend transverse to the length of the channel 183. The baffles 184 cause rapid changes in the direction of blow-by gases flowing along the lubricant separation chamber 180 and thereby promote lubricant separation.

With reference to FIGS. 4 to 6, the operation of the crankcase ventilation system will now be described. During use, blow-by gases enter the crankcase 140 and collect in the crankcase enclosure. These gases are drawn into the lubricant separation chamber 180 from the compartment 148 via the chamber inlet 181 under the action of a partial vacuum in the air intake. As the vented blow-by gases, or "breather gases", run up the length of the crankcase 140, droplets of lubricant which are mixed in with the breather gases drop out under the action of gravity and drain to a sump (not shown) via the chamber inlet 181 and the compartment 148. The separation of the lubricant droplets is further encouraged by the baffles 184, which force the breather gases to change direction and velocity and encourage inertial separation of the lubricant droplets. The vented gas then leaves the crankcase 140 via the chamber outlet 182 and is directed to the separator inlet 191 by the first external hose 192. Similarly, gases are vented from the baffle chambers in the cam covers and directed to the separator inlet 191 by the fourth external hose 195. The gases are centrifuged within the separator 190 to further separate smaller droplets of lubricant from the gases. The filtered gases are then circulated to the air intake by the second external hose, while the separated lubricant is returned to the sump via the drain outlet 193 and the third external hose 194.

By integrating the lubricant separation chamber into the crankcase and routing the blow-by gases through the crankcase, the number and length of external hoses can be reduced relative to arrangements which use an external lubricant separation chamber. Additionally, the length and, therefore, effectiveness of the lubricant separation chamber can be increased relative to a baffle chamber in the cylinder head and the separated lubricant more readily returned to the crankcase.

Although the invention has been described above with reference to one or more preferred embodiments, it will be appreciated that various changes or modifications may be made without departing from the scope of the invention as defined in the appended claims.

The invention claimed is:

1. A marine outboard motor having an internal combustion engine, the internal combustion engine comprising:
   an engine block defining at least one cylinder;
   an air intake configured to deliver a flow of air to the at least one cylinder;
   a crankcase forming a crankcase enclosure in which a crankshaft is mounted for rotation about a crankshaft axis which is substantially vertical when the marine outboard motor is vertical, the crankcase enclosure being bounded at its upper and lower ends by upper and lower end walls; and
   a crankcase ventilation system configured to vent blow-by gases from the crankcase and to supply vented blow-by gases to the air intake, wherein the crankcase ventilation system comprises a lubricant separation chamber for separating lubricant from the blow-by gases, wherein the lubricant separation chamber is defined by the crankcase,
   wherein the crankcase comprises a compartment located at the bottom end of the crankcase below the lower end wall, the compartment being in fluid communication with the crankcase enclosure through one or more apertures in the lower end wall, wherein the lubricant separation chamber has a chamber inlet which extends from the compartment, and wherein the lubricant separation chamber extends along substantially the entire length of the crankcase substantially parallel to the crankshaft axis.

2. The marine outboard motor of claim 1, wherein the chamber inlet which extends from the compartment is the sole inlet of the lubricant separation chamber.

3. The marine outboard motor of claim 1, wherein the lubricant separation chamber has a chamber outlet extending through an outer wall of the crankcase, wherein the chamber outlet is connected to the air intake by at least one external hose.

4. The marine outboard motor of claim 3, wherein the crankcase ventilation system further comprises an external lubricant separator connected to the lubricant separator chamber outlet and to the air intake by the at least one external hose.

5. The marine outboard motor of claim 4, wherein the external lubricant separator comprises one or both of a cyclonic separator and a centrifugal separator.

6. The marine outboard motor of claim 1, wherein the engine block comprises a cylinder block casting and a bed plate casting which are joined together to form the crankcase.

7. The marine outboard motor of claim 6, wherein the lubricant separation chamber is defined by an open channel in one or both of the cylinder block casting and the bed plate casting which is closed when the cylinder block casting and the bed plate casting are joined together to form the crankcase.

8. The marine outboard motor of claim 6, wherein the lubricant separation chamber is defined by an open channel in the cylinder block casting which is closed by the bed plate casting when the cylinder block casting and the bed plate casting are joined together to form the crankcase.

9. The marine outboard motor of claim 1, wherein the lubricant separation chamber is a quiescent chamber.

10. The marine outboard motor of claim 1, wherein the lubricant separation chamber comprises one or more flow obstructions configured to cause a change in direction and/or velocity of blow-by gases flowing along the length of the lubricant separation chamber and thereby promote lubricant separation.

11. The marine outboard motor of claim 10, wherein the one or more flow obstructions comprise one or more baffles and/or tortuous passageways.

12. A marine vessel comprising the marine outboard motor of claim 1.

* * * * *